United States Patent Office 2,709,223
Patented May 24, 1955

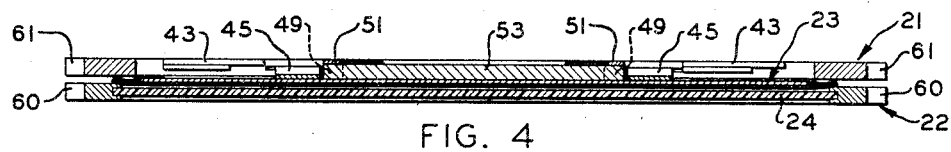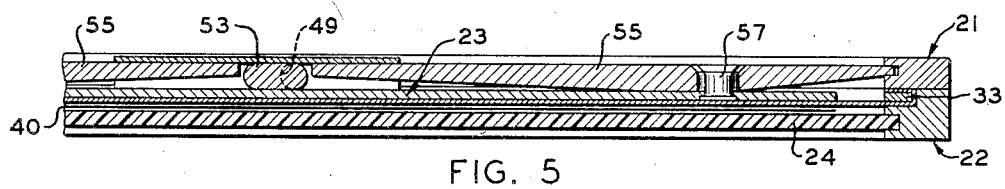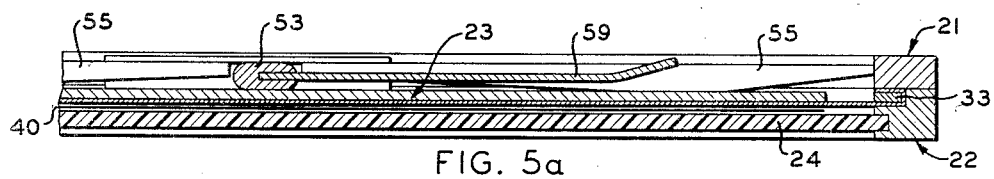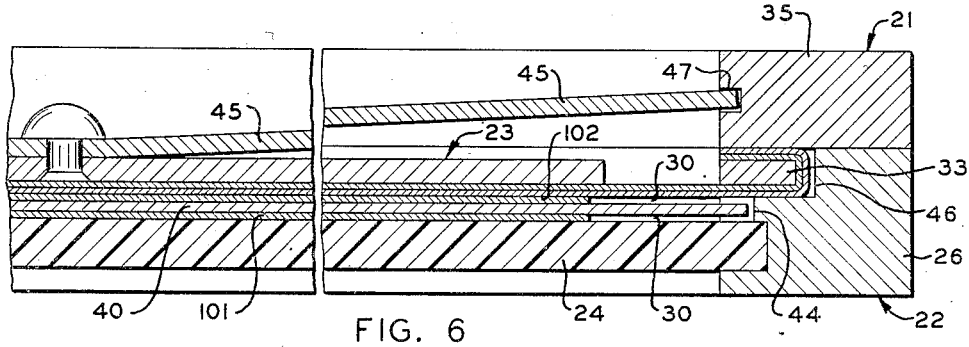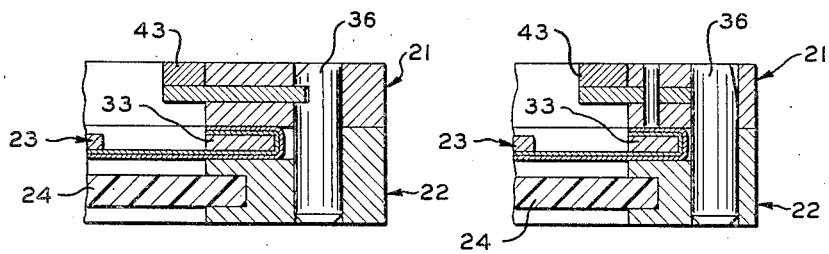

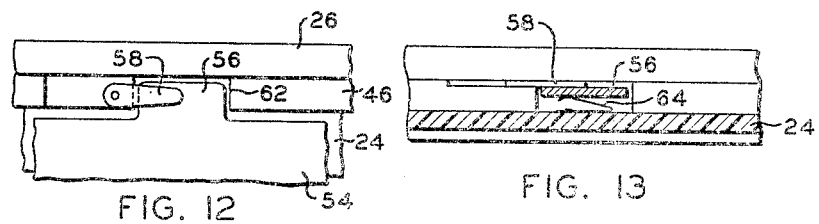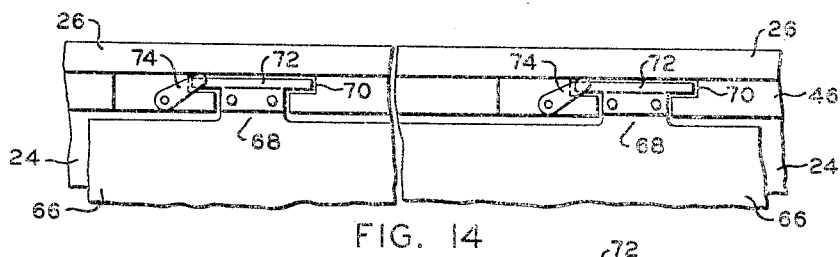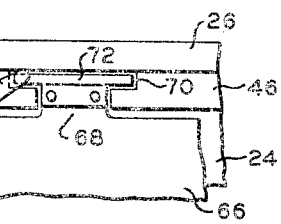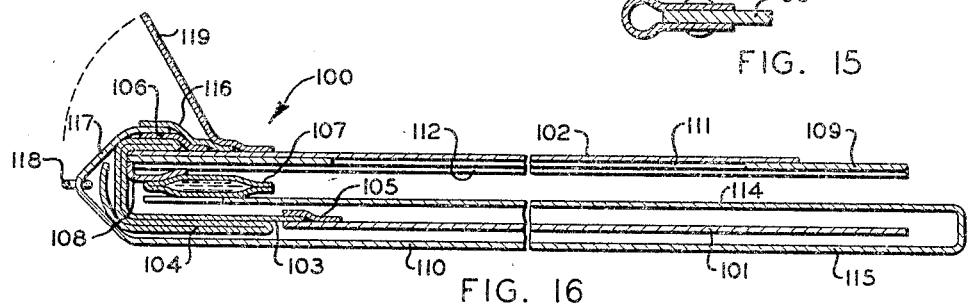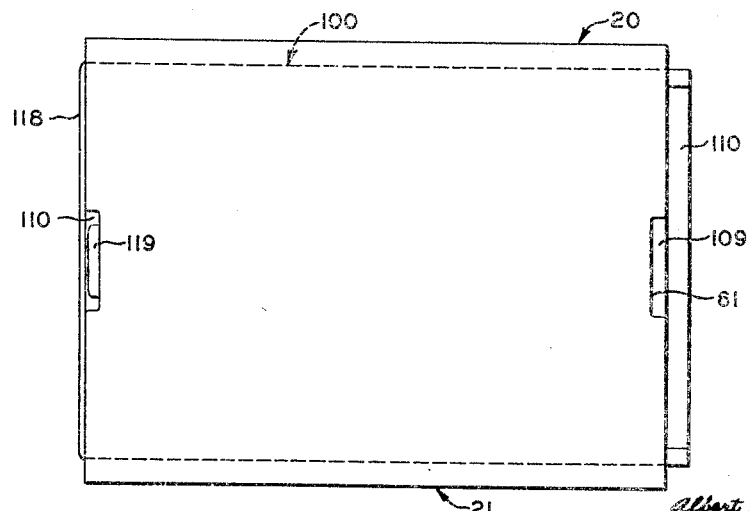

2,709,223

X-RAY CASSETTE

Albert J. Bachelder, Lexington, William J. McCune, Jr., South Lincoln, and Otto E. Wolff, Concord, Mass., assignors to Polaroid Corporation, Cambridge, Mass., a corporation of Delaware Application May 19, 1951, Serial No. 227,238

30 Claims. (Cl. 250—68)

This invention relates to holders or cassettes for photosensitive film for carrying out the exposure thereof by X-rays and is particularly concerned with a holder or cassette for a photosensitive film assembly of the self-developing type.

Objects of the invention are to provide a cassette adapted to be loaded in daylight or in visible illumination with a photosensitive film assembly and adapted to hold said film assembly for exposure to X-rays, gamma rays and various other types of nuclear radiation, and also to assist in the processing of a film assembly mounted therein; to provide a cassette constructed with a compartment within which a film assembly is removably mounted and from which it is withdrawable upon exerting a pulling force on a portion of the film assembly adapted to extend through the cassette, and wherein the cassette is substantially opaque to visible and near visible light actinic to a photosensitive portion of the film assembly while being transparent to X-rays, gamma rays and the like, and with the cassette having light-seal means engageable with a film assembly held therein; to provide a cassette of the character described having an opening at each end thereof through each of which openings a portion of a film assembly mounted within the cassette may be withdrawn; to provide a cassette of the character described suitable for carrying out X-ray photography and having an intensifying screen mounted within the cassette, and especially an intensifying screen mounted in a manner so that a portion of a film assembly may be positioned adjacent opposite surfaces of the screen; to provide special means in a cassette for bringing into contact an intensifying screen and a film assembly mounted in a cassette; and to provide a cassette which possesses the features described and which is usable with conventional film assemblies or with a film assembly of the self-developing type.

Further objects of the invention are to provide the combination of a film holder or cassette of the character set forth and a film unit or assembly which includes two overlying and hinged-together liquid-confining layers and which has a portion thereof adapted to extend through opposite ends of the cassette; and to provide a cassette for containing a film assembly which includes two overlying and hinged-together liquid-confining layers, with one of the liquid-confining layers having a photosensitive portion, and wherein said assembly includes a substantially light-opaque envelope releasably engaged around or encasing the liquid-confining layer having said photosensitive portion to prevent the exposure thereof by visible and near visible light, said film assembly having a portion thereof adapted to extend through each end of said cassette when the film assembly is mounted within the cassette whereby to permit withdrawal of said envelope and then the withdrawal of said liquid-confining layers from said cassette.

Other objects of the invention will in part be obvious and will in part appear hereinafter.

The invention accordingly comprises the product possessing the features, properties and the relation of components, and the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is a sectional elevation taken on the line 4—4 of Fig. 1;

Fig. 5 is a broken-away, sectional elevation taken on the line 5—5 of Fig. 1;

Fig. 5a is a broken-away, sectional elevation taken on the line 5a—5a of Fig. 1;

Fig. 6 is a broken-away, sectional elevation taken on the line 6—6 of Fig. 1;

Fig. 7 is a broken-away, sectional elevation taken on the line 7—7 of Fig. 1;

Fig. 8 is a broken-away, sectional elevation taken on the line 8—8 of Fig. 1;

Fig. 12 is a broken-away plan view of a portion of a frame of a cassette and details a modified embodiment of intensifying screen and means for mounting and removably securing the intensifying screen within the frame;

Fig. 13 is a broken-away, elevational view of the frame and intensifying screen shown in Fig. 12;

Fig. 14 is a broken-away plan view illustrating a portion of a frame of a cassette and details another embodiment of an intensifying screen and hinge means for supporting the screen within the frame;

Fig. 15 is a detailed side elevation, with parts in section and with parts broken away, of the intensifying screen of Fig. 14;

Fig. 16 is a diagrammatic sectional elevation of an assembly of a self-developing type film; and Fig. 17 is a diagrammatic plan view of a cassette, similar to the cassette of Fig. 1 but with parts removed, and illustrates the cassette in loaded condition and with a film assembly of the character disclosed in Fig. 16 mounted therein.

Figure 1:
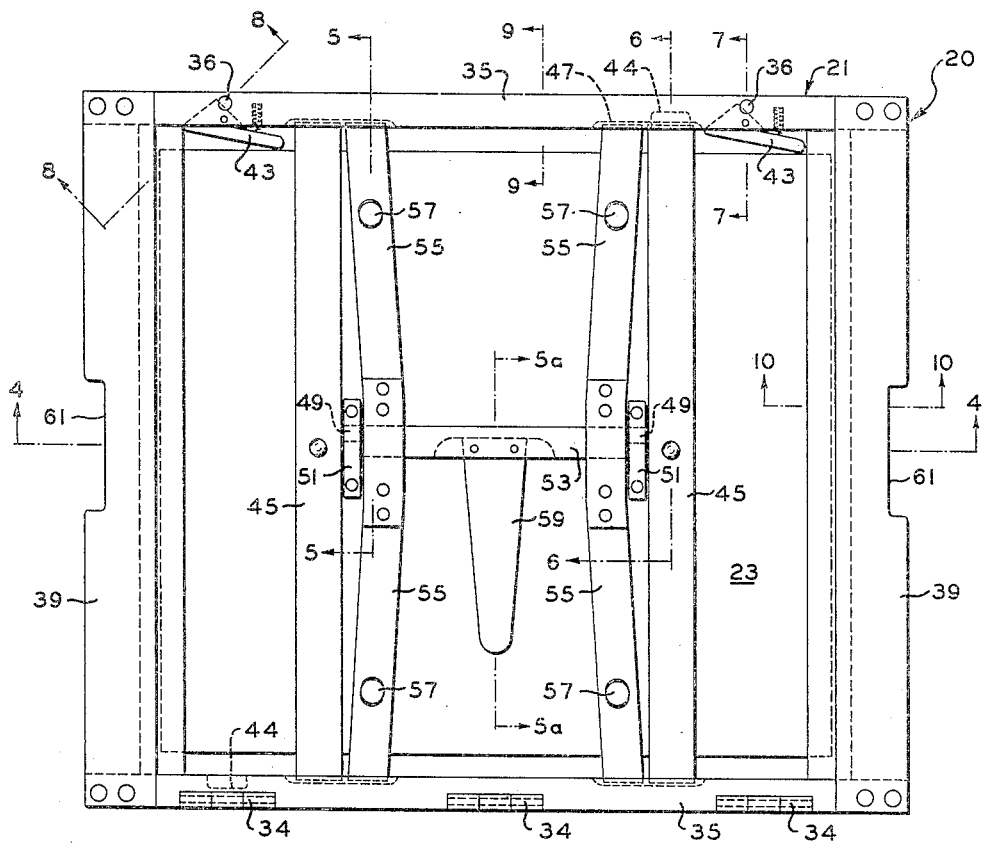
Figure 1 is a plan view of one embodiment of a cassette or film holder shown from the back thereof.
Figure 2:
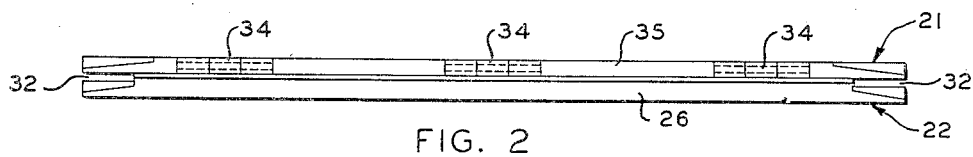
Fig. 2 is a side elevation of the cassette of Fig. 1.
Figure 3:
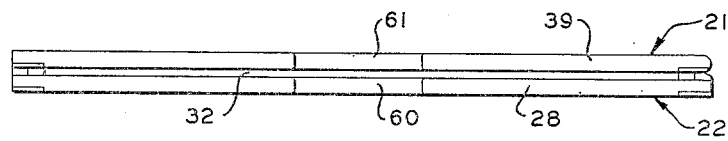
Fig. 3 is an end elevation of the cassette of Fig. 1.

With reference to the drawings, wherein like parts are designated by similar reference numerals throughout the different views, there is shown in Figs. 1 through 10 one embodiment of an apparatus 20 suited for carrying out X-ray photography and usable for holding a self-developing film of the character shown in Fig. 16 and designated by the reference numeral 100. As disclosed in these figures of the drawings, the cassette or film holder 20 comprises a back frame 21 and a front frame 22 which are adapted to be mounted in superposed relation to each other and releasably secured together. The openings in the frames 21 and 22 are closed respectively by members in the form of plates 23 and 24 which are mounted in the openings in a manner which will presently appear.

For the purpose of convenience, the terms "front frame," "front plate," "front" and the like are applied to the film holder or cassette to designate the portion or face thereof through which actinic radiation is adapted to enter the holder, and the terms "back frame," "back plate," "back" and the like are applied to the portion or face of the holder opposite to the "front" thereof and furthest removed therefrom.

Each of the frames 21 and 22 may be made up of a plurality of individual structural members which are secured together by rivets or other fastening means whereby to provide a rigid frame with an opening therein and are formed of materials which are substantially opaque to light waves. Alternatively, each frame 21 and 22 may comprise a casting suitably designed to permit plates 23 and 24 to be mounted therein. Frames 21 and 22 may be formed of any metal or alloy of the character conventionally employed by the art for X-ray cassettes. Organic plastic materials and wood may also be employed for the frames.

Since the cassette 20 is designed for the purpose of X-ray photography, the front plate 24 thereof is preferably formed of a substantially grainless material as this is the portion of the cassette through which the X-ray exposure is made. For this purpose the plate 24 preferably comprises an organic plastic. Many suitable plastic materials are well known to the art and among these mention may be made of phenolic materials as commonly employed. The front plate 24 is of course opaque to visible and near visible radiation but is transparent to X-rays, gamma rays and other forms of nuclear radiation. Conventionally, a black pigment or black dye may be distributed throughout the plastic material which forms the front plate whereby to render it opaque.

As shown, the front plate 24 is somewhat larger than the opening in its frame 22 and is adapted to be mounted within recesses formed in the side members 26 and end members 28 of the front frame 22. This expedient provides a substantially lighttight mounting for the front plate within its frame and fixedly supports the front plate therein.

One of the features of the present invention is the employment of a plate in the back frame which is movable relative to the frame as distinguished from the fixedly mounted front plate 24. To carry this into effect, the back plate 23 is a composite structure comprising a metal plate element 25, somewhat smaller than the opening in the back frame, and a flexible extension portion or skirt comprising a pliable material which has greater dimensions than the opening in the back frame and to which the back plate is secured whereby a portion of the pliable material extends the plate member at each of its sides and its ends. As particularly shown in Fig. 9, the extension or skirt of pliable material comprises a layer 29 of felt superposed on a layer 31 of a coated fabric which is substantially opaque to visible and near visible light. These layers are cemented or otherwise fastened together. An example of a suitable fabric is a material conventionally used for making camera bellows. This extension is suitably fastened to the front or inner surface of the plate element 25, as for example by the use of cements, adhesives or the like, with the fabric side thereof next to the plate element.

Figure 9:
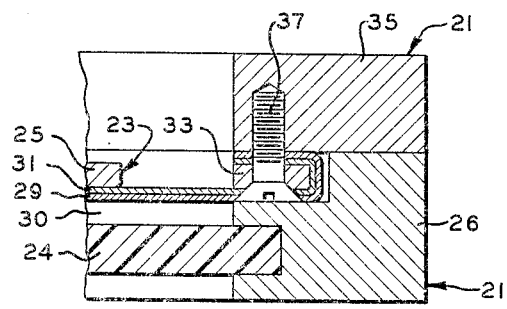
Fig. 9 is a broken-away, sectional elevation taken on the line 9—9 of Fig. 1.
Figure 10:
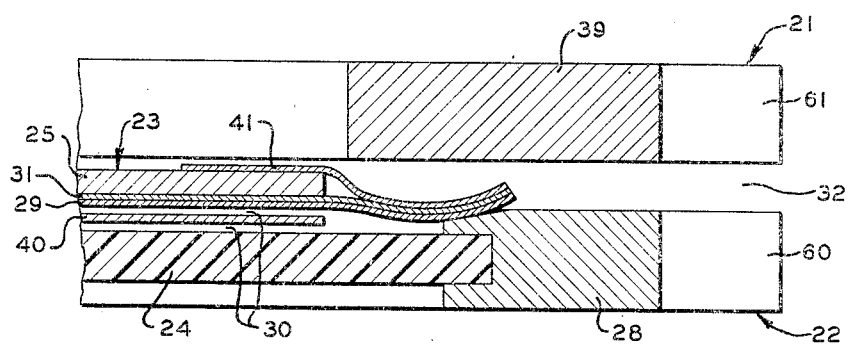
Fig. 10 is a broken-away, sectional elevation taken on the line 10—10 of Fig. 1.

Means for securing the composite back plate 23 in the back frame is shown particularly well in Fig. 9 and makes use of an individual securing strip 33 mounted to extend lengthwise of each side member 35 of the back frame and fixed thereto by screws 37 threaded into the inner surface of the back frame. A portion of the back plate extension or skirt 29, 31 adjacent each side thereof is wrapped around one of the strips 33 whereby screws 37 individually pass through the extension twice and, in conjunction with strips 33, are effective to secure the composite back plate 23 in its frame. Each strip 33 is approximately as long as the sides of the pliable skirt 29, 31 and the screws 37 extend therethrough at approximately spaced intervals. As will presently appear, the side members 26 of the back frame are provided with a shoulder portion 46 whereby to provide accommodations for the securing strips 33 and the extension portion 29, 31 of the back plate when the frames are in closed and superposed relation.

The just described construction permits relative movement between the composite back plate 23 and its frame, yet is designed to retain the plate well within the confines of the frame. Since the sides of the plate extension 29, 31 are secured to the side members 35 in a tensioned condition, the extent of the movement of the plate 23 is controllable by the magnitude of the tension employed for tautening the plate extension.

It will be apparent that the just described construction provides a light seal between the sides of the composite plate 23 and the sides of the back frame 21. It is also necessary to provide a light seal between the ends of the composite back plate and the end members 39 of the back frame. For this purpose use is made of a pair of light-seal spring members 41 of suitable thin spring metal which are individually secured as by adhesive, rivets, welds or other fastening means to the outer surface of the plate element 25 at opposite ends thereof. Springs 41 are positioned transversely of the plate element 25 and extend entirely across and beyond the plate element 25 to urge these end portions frontwardly with respect to plate element 25.

As will presently appear, the cassette 20 is constructed so that a passageway 32, which opens into the interior of the cassette, extends through both ends thereof when the frames 21 and 22 are in superposed relation. Each of the end portions of plate extension or skirt 29, 31 is sufficiently long to enter the mouth of the passageway 32 which is respectively adjacent thereto. Springs 41 urge these end portions of the extension 29, 31 into contact with the back surface of the end members 28 of the front frame 22 and, together with said plate extensions, are effective to provide light-seal means for closing the ends of the cassette 20 to actinic light when the frames are in superposed relation.

As has been pointed out, the front and back frames 21 and 22 are adapted to be superposed on each other and secured in this relation. In the embodiment shown in Figs. 1 through 10, the front and back frames 21 and 22 are hinged together along one side by appropriate and conventional hinges 34 which are secured to the adjacent side members of the frames. Hinges 34 permit pivotal movement between the frames 21 and 22 of 180° so that when the cassette is on a flat surface and is fully open, the frames will be in contact with the surface. Other types of hinges may of course be employed whereby the frames 21 and 22 may be pivoted relative to each other through 270° or even 90°, although pivotal movement limited to 90° reduces the ease with which a film assembly may be loaded into the cassette.

Latch means for releasably securing the frames 21 and 22 in superposed relation are associated with the pair of side members 26 and 35 opposite the hinged side of the cassette. Details of these latch means are shown in Figs. 1, 7 and 8. In the embodiment illustrated, two similar latch mechanisms are located near opposite ends of the cassette. Each latch mechanism makes use of a pin 36 mounted in a side member 26 of the front frame and extending beyond the back surface thereof for engagement within a cooperating opening in the corresponding side member 35 of the back frame when frames 21 and 22 are in superposed and closed relation. A notch formed in the unsupported end of each pin 36 is adapted to be engaged by a latch member 43 pivotally mounted within a recess formed in the side of the member 35 with which the latch is associated.

Each said recess and the latch member associated therewith is designed so that the latch portion of the member 43 is located within the recess for engagement and disengagement with the pin 36 upon pivotal movement of the latch member, while the operating portion of the latch member is arranged to overlie the outer or back surface of the composite back plate 23 in a position for easy manual operation. The individual latch members 43 are spring-loaded in the manner shown and are constantly urged into fastening position.

Other means for securing and/or mounting the frames 21 and 22 in superposed or closed relation may be employed. For example, the hinge means 34 may be dispensed with and latch mechanism similar to that disclosed at 36 and 43 may be associated with both sets of side members of the frames. Under these circumstances, the two frames are entirely separable from each other. It will also be appreciated that other types of latch mechanism may be utilized, such for example as latch means operable from the outer side edges of the frames 21 and 22.

It will be appreciated that a compartment 30 is provided between the front plate 24 and the back plate 23 when the frame members are in superposed relation. It is within this compartment that the photosensitive film assembly is adapted to be mounted. Due to the movable mounting for the back plate 23, it will normally be urged toward the front plate 24 when the cassette is held in a horizontal position with the front plate downwardly. Back plate 23, in addition to closing the opening in the frame 21, also serves as means for applying pressure to a film assembly mounted within the cassette for the purpose of placing the film assembly or some portion thereof into intimate contact with an intensifying screen adapted to be contained within the compartment 30. To carry this out, the back plate is spring-biased so that it is urged to the limit of its movement toward the front plate. At the same time it is desirable to provide means for retracting the back plate to the limit of its movement furthest away from the front plate in carrying out operations for loading the cassette, as well as operations involved in withdrawing a film assembly from the cassette for processing. Means for accomplishing both of these requirements comprise spring means which constantly urge the back plate toward the front plate and lever mechanism for overcoming the spring loading of the back plate and retracting it to its furthermost position from the front plate.

The just-mentioned spring means comprise a pair of flat, elongated spring members 45 which are fixed, as by a rivet through their respective centers, to the outer surface of the back plate element 25. Springs 45 extend transversely of the back plate 23 and are located symmetrically of the plate element 25, each somewhat removed from the ends thereof. Each side member 35 of the back frame is provided with a pair of recesses 47 within which the free ends of springs 45 are engaged.

The just-mentioned lever mechanism comprises a cam bar 53 provided at opposite ends with stub shafts 49 which are eccentric with respect to the bar and which are rotatably supported in bearings 51 fixed to the outer surface of the back plate. Cam bar 53 is provided with cam surfaces adapted to operatively contact a pair of lever members 55 which are individually located at opposite ends of the cam bar and which extend transversely of the plate element 25 and over the cam bar and are fixed to the plate element by rivets 57. An operating handle 59 is fixed to the cam bar 53 centrally thereof.

Lever members 55 are of sufficient length to have their free ends engaged within the recesses 47 of the side members 35, these recesses being constructed to receive the ends of the springs 45 as well as the ends of the lever members. As may be observed particularly well in Figs. 1, 5 and 5a, each lever member 55 comprises two end sections located on each side of the cam bar 53 and fixed to the plate element by the rivets 57 and a central section which is joined to the end sections and which extends over the cam bar. The end sections of each lever member are relatively rigid and of thick material while the central section is a thin flexible strip and may be formed of spring metal. Connection between the central and end sections of each lever member 55 may be by conventional fastening means, as for example by the use of rivets as illustrated.

As previously pointed out, the springs 45 for biasing the back plate constantly urge the plate element 25 thereof toward the front plate 24. The just described lever mechanism provides means for overcoming the force created by the springs 45 whereby to move the back plate 23 in its frame. In this connection, the cam bar 53 is arranged to have low points on the cam faces thereof in contact with the lever members 55 when the operating handle 59 is inoperative and is in overlying position with respect to the back plate 23, namely, the position illustrated in Figs. 1, 5 and 5a. Pivotal movement of the handle through 90°, and to an upright position with respect to the back plate, brings the working surfaces of the cam bar into contact with the lever members 55 and lifts the lever members. Since the lever members are fixed to the plate element 25, the composite back plate 23 will also be lifted or retracted to its most rearward position. The holes through the lever members 55 for the rivets 57 are elongated to care for extension and retraction of the lever members resulting from movement of the handle 59.

Movement of the handle to the upright position described, whereby to retract the plate against the spring pressure of the springs 45, will obviously increase the depth of the compartment 30. This is desirable in carrying out the loading of the cassette with a photosensitive film assembly and also when withdrawing the assembly or a part thereof from the closed cassette.

As already pointed out, the cassette 20 is designed with a passageway 32 through each end thereof which communicates with the compartment 30 within the cassette. These passageways 32 are designed to permit a photosensitive film assembly or some part thereof to be removed from the cassette without opening the cassette or moving the frames 21 and 22 out of their superposed relation and while still maintaining a light seal around the peripheral edges of the superposed frames. Such a passageway 32 may be provided in that surface of one of the end members of one of the frames which is adapted to be seated on the other frame as by cutting away or relieving said surface in the manner illustrated in Fig. 3 with regard to the end members 28 of the front frame 22. In addition, to facilitate handling of a photosensitive film assembly, it is preferable, although not necessary, to cut away the outer edges of the end members 28 and 39 to provide recesses 60 and 61 positioned centrally of the cassette at the respective ends thereof.

In carrying out X-ray photography, it is customary to utilize an intensifying screen in the cassette for the purpose of improving image rendition and quality. An intensifying screen 40, adapted for use with the cassette 20 and formed by conventional practices and of conventional screen materials, is detailed in Fig. 11. The intensifying screen 40 is of generally rectangular shape and has an effective width and length slightly less than the width and length of the front frame 22 whereby it is readily mountable therein and is positionable within the compartment 30 when the frames 21 and 22 are closed.

In instances where a cassette is designed for withdrawal of a film assembly mounted therein through an end or ends of the closed cassette, as in the case of the cassette 20, there is a tendency for an intensifying screen to be displaced longitudinally and to be withdrawn in part or in full from the cassette. It is therefore desirable to provide means for retaining the intensifying screen against longitudinal displacement when the film assembly or some part thereof is withdrawn from the cassette. As a part of these means, the intensifying screen is provided with a plurality of tabs or extensions 42 at one or at both of the side edges of the screen. Specifically, the screen 40 is illustrated as having a pair of tabs 42, one extending from each side edge of the screen. Except for these tabs, the screen 40 is substantially similar in all other respects to conventional intensifying screens.

Tabs 42 are adapted to seat freely within recesses or notches 44 provided in the shouldered portion 46 of side members 26 of the front frame. As shown in Figs. 1 and 6, the recesses 44 extend from the inner edge of each side member 26 toward the outer edge thereof and in depth extend partially through the shoulder portion 46 and to the inner surface of the front plate 24. The bases of recesses 44 need not be provided by the inner surface of the front plate 24 in instances where the recesses are shallower than those shown or where the thickness of the shoulder 46 of each side member 26 is increased over that illustrated. It will be appreciated that in addition to restraining longitudinal displacement of the intensifying screen 40, the tabs 42 and cooperating notches 44 provide means for mounting the screen 40 for movement relative to its supporting frame 22 whereby the screen is positionable in spaced relation to the front and back plates of the cassette to permit a portion of the film assembly to be located on opposite sides of the screen and to be in contact therewith.

The tabs 42 shown in association with the screen 40 are illustrated as positioned near the ends of the screen but are located unsymmetrically with respect to each other. This unsymmetrical positioning is of course followed for the screen-receiving recesses 44 and is preferred in instances where the screen 40 is coated with a fluorescent material on one surface only as it makes it impossible to place the screen in the cassette in an improper or upside down manner. In instances where a fluorescent material is carried on both surfaces of the screen, the tab arrangement disclosed in Fig. 11 need not be followed. For example, both tabs may be placed at the same end of the screen and in alignment transversely with each other. While only one pair of tabs or extensions have been shown as provided on the screen 40, it will become apparent that a greater or even less number of tabs may be employed and also that all tabs may extend from the same side of the screen.

Figure 11:
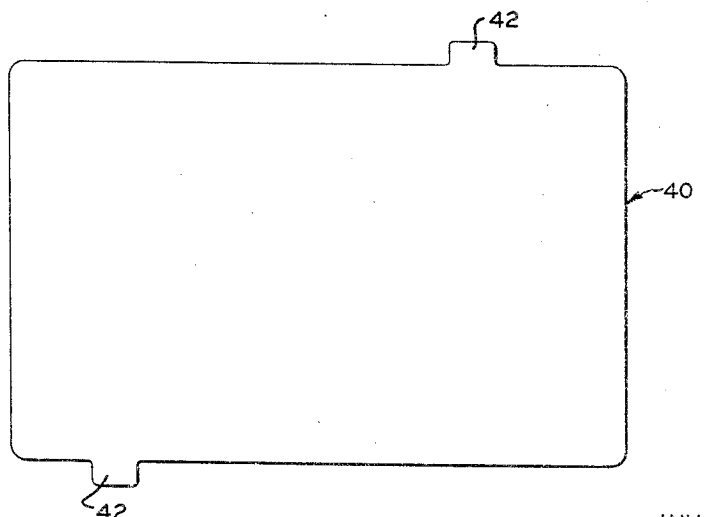
Fig. 11 is a plan view of an intensifying screen usable with the cassette of Fig. 1.

In the screen mounting just described in connection with Figs. 1, 6 and 11, it will be appreciated that the screen will be loosely held within the front frame 22 of the cassette and is removable therefrom. When the cassette is in open condition and a film assembly or some portion thereof is to be positioned between the screen 40 and the front plate 24, the screen is first removed from its frame and the part of the film assembly which is to be located between the front plate 24 and the screen is then placed in the front frame, following which the screen is dropped into place within the front frame. It is desirable in some instances to mount the intensifying screen so that when the cassette is open, the screen will be spaced a sufficient distance from the inner surface of the front plate to permit a film assembly or portion thereof to be inserted between the screen and the inner surface of the front plate without removal of the screen. A screen mounting construction which makes this possible is illustrated in Figs. 12 and 13.

Figs. 12 and 13 show a portion of a cassette including a side member 26 of the front frame and the front plate 24, with the side member provided with a recess 62 which is similar to a recess 44 and in which an extension or tab portion 56 of a screen 54 is mounted. The screen 54 and its tabs 56 are substantially similar to the screen 40 of Fig. 11 with the exception that screen 54 has four tabs 56, a pair of tabs extending from each side of the screen. Since the screen 54 is adapted by design to be supported at four locations, each of the members 26 of the front frame is provided with a pair of recesses or notches 62.

An elongated spring 64, formed from flat spring stock of suitable width, is mounted within each recess 62. Each spring 64 is shaped, as by bending, to provide a substantially flat base portion and a portion which is located between the ends of the spring and which is turned over the base and angularly inclined to the base. The base portion of spring 64 is adapted to be seated on the base of its recess 62, which in this instance is provided by the front plate 24, and the free end of the spring at the overturned portion is suitably rounded for bearing contact with the surface of a screen tab 56 inserted within the recess 62.

A pivoted latch plate 58 is associated with each recess 62. Means for retaining the screen in mounted condition make use of latch plates 58 individually associated with each recess 62 and pivotally mounted on the surface of shoulder 46 for movement into and out of overlying relation with respect to each recess. Springs 64 are sufficiently strong to urge the tabs of the screen into contact with the overlying latch plates 58 when the cassette is open. At the same time, the latch plates 58 provide means for removably mounting the screen within the cassette. As shown, each latch plate is mounted in a relieved portion of the surface of the shoulder 46 whereby it permits the front and back frames to be superposed in tight contact.

Other types of spring mounting are employable with the screen 54. For example, one or more pins may be mounted in each recess 62 to extend from the base or front plate 24 toward the top of the recess, i. e., rearwardly of the front plate. Each such pin has a coil spring engaged therearound and in contact with the base of its recess and an enlarged collar which is slidably mounted on the pin whereby to constantly urge the collar rearwardly of or away from the plate 24. In this instance, the screen tabs 56 are provided with a hole for each pin whereby the pin may extend through the screen and the screen may be seated on the enlarged collar. Latch plate means similar to the latch plate 58 is employed in this construction for removably retaining the screen in mounted position within the front frame.

As a further concept, it is intended to hinge the screen to one of the side members of one of the frames. A variety of constructions for carrying out this concept are possible. In all instances, the screen will be provided with a pair of extensions or tabs on one side edge thereof or a single elongated tab extending from one side edge thereof. Either of these expedients makes use of one or more recesses, such as the recesses 44 of Figs. 1 and 6, in one side member of the front frame. By one construction, one-half of a butt hinge is secured to the base or a wall portion of the recess and the other half of the hinge is secured to the cooperating tab of the intensifying screen. Such an arrangement will permit pivotal movement of the intensifying screen through 90° when the cassette is open for film loading purposes, although the screen will by reason of its mounting remain connected to the frame with which it is associated.

As examples of other types of hinge means, reference is made to flexible hinges of pliable material whereby the intensifying screen may be mounted for movement through 180°. Such hinges may be formed of suitable webbing which may possess elastic properties if desired and may even be formed of thin strips of spring metal.

One simple embodiment of hinge means is disclosed in Fig. 14, which shows in plan a portion of a cassette including a side member 26 and front plate 24 with the side member provided with a pair of recesses 70 adapted to receive the extension tabs 68 provided at one edge of an intensifying screen 66. Recesses 70 differ from recesses 44 and 62 in that they are generally T-shaped in plan. In addition, each tab has a hinge plate 72 which is shown in detail in Fig. 15 and which is fixed thereto as by rivets or other fastening. The hinge plate 72 is a thin metal strip which is bent over upon itself and has its free ends fixed to the tabs of the screen 66. The bent-over portion of the hinge plate is rounded as illustrated in Fig. 15 so as to provide a pivot and is somewhat longer than the main body of the plate whereby the plate 72 is also T-shaped for pivotal mounting engagement within a recess 70. A latch plate 74, similar to the latch plate 58 and similarly mounted in a relieved portion of the shoulder portion 46 of the side member 26, is associated with each recess for retaining the screen tab 68 in the recess.

It will be apparent that this construction permits the screen 66 to be pivoted through 90° for loading the film assembly into the open cassette, following which the screen may be moved in the opposite direction to place one surface thereof on the portion of the film assembly supported within the front frame. At the same time, the mounting means disclosed in Figs. 14 and 15 permits the screen 66 to be positioned in spaced relation between the front and back plates of the closed cassette.

Use and operation of the cassette 20 may best be understood in conjunction with a film assembly usable with the cassette. As has been previously pointed out, cassette 20 is specially designed for use with self-developing film. A film assembly of this general character and suitable for use in carrying out X-ray photography is diagrammatically shown in Fig. 16, which is a longitudinal cross section taken through the film assembly.

With specific regard to Fig. 16, the film assembly, designated generally by the reference numeral 100, comprises a pair of liquid-confining layers 101 and 102 which are hinged together at one end whereby they may be arranged in overlying relation or may be spread apart with respect to each other. The liquid-confining layer 101 includes a photosensitive area over at least a portion of the surface thereof adapted to be arranged in overlying relation to the layer 102 whereby the layer 101 constitutes a photosensitive negative layer or element. A preferred photosensitive material is a silver halide emulsion and the layer 101 comprises conventional film base material on which the silver halide emulsion is carried. The liquid-confining layer 102 includes a print-carrying area for receiving an image by transfer on at least a part of the surface thereof adapted to be arranged in overlying relation with respect to layer 101. A conventional photographic insensitive paper such as baryta paper is an example of a material which forms the layer 102, including the print-carrying area thereof. Layer 102 constitutes in effect a print-carrying layer or positive element for a transfer image.

Means for hinging the layers 101 and 102 together employs a leader 103 in the form of a strip of flexible or pliable material such as paper or the like, for example conventional film leader stock. Material of this character is substantially opaque to visible and near visible light. As may be noted, liquid-confining or positive layer 102 is arranged to extend beyond the photosensitive or negative layer 101 at one end of the film assembly. Leader 103 has one of its ends lapped over the inner surface of liquid-confining layer 101 at the end of layer 101 which is overhung by the layer 102 and is secured thereto by means of an adhesive strip or tape 105. From the negative layer 101, leader 103 extends around the overhanging end of positive layer 102 and over the outer surface of layer 102 for a short distance where it is doubled over upon itself and secured to the layer 102 by means of an adhesive strip or tape 106.

Adhesive strips 105 and 106 are both of a length approximately equal to the width of the liquid-confining layer with which they are respectively associated and extend transversely of the layers 101 and 102. Similarly, leader 103 between the connecting strips 105 and 106 has a width approximately equal to the widths of layers 101 and 102 and is positioned transversely of said layers. The portion of leader 103 between the connections 105 and 106 to the liquid-confining layers provides hinge means which permit pivotal movement of layers 101 and 102 relative to each other at one end of the film assembly whereby the layers may be spread apart or brought into contact or positioned in spaced and generally parallel relation to each other.

The connection of leader 103 to the positive or print-carrying layer 102 occurs at a location between the ends of the leader. It is to be observed that leader 103 has an end connected to negative layer 101 and an unconnected or free end. This permits the portions 104 of the leader which lie between the connection 106 and the free end of the leader to be wrapped around the ends of layers 101 and 102 and to be folded so as to have its free end extend beyond the ends of the joined layers 101 and 102. Thus, the portion 104 of leader 103, after being doubled over upon itself at the connection 106, is folded or wrapped around the ends of the joined layers 101 and 102 in contact with the hinge portion of said leader to a position adjacent the end of layer 101 where the leader portion 104 is again doubled over upon itself to reverse its direction and extends in this reverse direction from the last-mentioned fold to its free end.

Leader portion 104 may have a width similar to the width of the hinge portion of the leader. Preferably, however, leader portion 104 is made considerably narrower than the hinge portion of the leader and is given a width approximately equal to that of the cutaway portions 60 and 61 in the end members 28 and 39 of the frames of the cassette 20. In fact, the part of the leader portion 104 which protrudes beyond the liquid-confining layer 102 is adapted to lie within the cutaway portions 60 and 61 at one end of the cassette when the film assembly is loaded into the cassette and provides manually engageable means for straightening out the folded leader portion 104 preparatory to withdrawing the assembly from the cassette. It is to be observed that the leader portion 104 is readily straightened from its folded condition illustrated in Fig. 16 by the exertion of sufficient pulling force on the free end of the leader.

A rupturable container 107 holding a liquid photographic processing composition is mounted between liquid-confining layers 101 and 102 and is located at the hinged end of said layers to extend transversely thereof for the discharge of its liquid content, upon rupture, between said liquid-confining layers.

The container 107 is secured in the manner described by a flexible adhesive strip 108 adhered to the leader 103 and to the container 107, as detailed in Fig. 16, and is adapted to seat on a light-opaque envelope 110 which is removably secured around the liquid-confining layer 101 and the photosensitive area thereof or to seat on the leader 103 when said envelope is removed. A substantially liquid- and oxygen-impervious material which is also substantially opaque to visible and near visible light is employed in the formation of the container 107. Marginal portions of the walls of the container are releasably sealed together, whereby pressure applied to opposite sides of the container will force the liquid in the container to rupture the seal along the trailing edge of the container, i. e., the edge of the container furthest from the hinge means for layers 101 and 102, and discharge said liquid for spreading in contact with the liquid-confining layers. The liquid within the container preferably comprises a viscous solution of a thickening agent, a silver halide developer and a silver halide fixer.

To define the print-carrying area on the layer 102, use is made of a mask 109. Mask 109 is formed of thin tissue paper such as condenser paper and is adhered by use of a strippable adhesive to the liquid-confining layer 102. In carrying out a transfer process, image-forming complexes are transferred from the photosensitive material to the print-carrying element. Mask 109 is employed to assist in confining the deposition of these image-forming complexes to a predetermined area of the liquid-confining layer 102. As shown, mask 109 is provided with a rectangular aperture 111 which defines the picture area for the transfer image and is also provided with end and side borders or extensions. In width, the mask 109 is made substantially equal to the width of the liquid-confining layer 102.

A pair of spacer strips 112 formed, for example, of suitable paper, are secured as by an adhesive to the outer surface of the mask 109. Each strip 112 has a length substantially equal to that of the mask and extends lengthwise of the mask adjacent a longitudinal edge thereof and between said edge and the mask aperture 111. These spacer strips 112 assist in controlling the spreading of the liquid content of the container and in confining the liquid to a surface area lying within the spacers.

The film assembly 100, after removal of the envelope 110 and exposure of the photosensitive area of liquid-confining layer 101, is intended to be processed by drawing the attached liquid-confining layers 101 and 102 and container 107 between pressure-applying or wringer rolls which apply pressure to the opposite sides of the assembly and effect the rupture of the container and the spreading of its liquid content between layers 101 and 102 as the film assembly is moved relative to the rolls. In processing, the film assembly is fed between the pressure-applying rolls from its hinged end which provides the leading end of the assembly.

These pressure-applying rolls are suitably spring-loaded or otherwise pressed together to create the desired pressure. Simplified film construction is made possible if the pressure rolls are separated shortly after they have passed over the print-receiving area enclosed within the aperture of the mask. Under these circumstances, it is desirable to extend the mask beyond the end of the main body of the liquid-confining layer with which it is associated whereby to assist in collecting or trapping liquid in excess of that employed for processing purposes. It is for this reason that the mask is provided with the extension at the trailing end of the layer 102, i. e., the end of said layer which is furthest removed from the hinged end of the assembly.

While a mask 109 and spacer strips 112 are preferably mounted upon liquid-confining or print-carrying layer 102 to provide a composite structure, it is to be noted that they are not essential to the processing of the film assembly.

It is desirable to provide means which permit the film assembly 100 to be handled in the presence of light which is actinic to the photosensitive material of the film, i. e., visible and near visible light. For this purpose, use is made of the previously mentioned substantially light-opaque envelope 110. Envelope 110 is adapted to be removably mounted around the liquid-confining layer 101 having the photosensitive area thereon and may be formed of conventional flexible material, such as paper or the like, which is rendered opaque to visible and near visible light by an appropriate black dye or pigment. Suitable film leader stock is employed as the construction material for the envelope 110. A single sheet of material folded over upon itself to provide overlying wall members 114 and 115 is employed to provide the envelope. Wall members 114 and 115 are of unequal length and are sealed or otherwise secured together along their superposed longitudinal edges. The fold in the single sheet provides a closed end for the envelope.

The portion of the film assembly comprising the photosensitive or negative layer 101 is inserted within the open end of the envelope whereby the envelope wall 114 lies between layers 101 and 102. Envelope wall member 114 is longer than photosensitive layer 101 so that the ends of the layer 101 may be located between the ends of wall member 114 when the envelope is operatively encasing said layer. In this regard, wall 114 extends from the closed end of the envelope to a position adjacent the leading edge of the container 107 whereby the container may be seated on the outer surface of the envelope wall 114 when the envelope is engaged around the layer 101 and assists in providing a lighttight closure at the hinged or leading end of the film assembly.

As may be observed, envelope wall member 115 is longer than wall member 114. This permits the end portion 117 of the wall member 115 which extends beyond wall member 114 to be wrapped around the leader 103 and over the leader tape 106 and to be secured thereto and also to the outer surface of the liquid-confining or print-carrying layer 102 by an adhesive strip or tape 116 which extends transversely across the film assembly. An endless severing or tear string 118, having a loop of greater length than the transverse dimension of the envelope 110, is engaged around the end portion 117 of envelope wall 115 prior to folding the portion 117 around the layers 101 and 102 for securing the envelope to layer 102. Application of appropriate pulling force to the tear string is utilized to cause the severance of end portion 117 of envelope wall member 115 transversely of itself at a position near the seal 116 whereby to permit the envelope 110 to be removed from the layer 101.

The constructional features of the film assembly cooperate to provide a lighttight closure for the envelope 110 at the leading end of the assembly. For example, the layer 101 having the photosensitive area thereon is of a width whereby it fits snugly within the envelope, yet is slidable therein. In addition, the leader 103 is so arranged that the container 107 may be seated on the free end of the envelope wall member 114 whereby to cover said wall member and press it into contact with the supporting leader. Furthermore, leader 103 is formed of conventional film leader material and is itself substantially opaque to actinic light. The end portion 117 of the wall member 115 completes the lighttight closure by being drawn around the end of the film assembly and having its free end fixed to the outer surface of the layer 102.

To facilitate handling of the film assembly 100, use is made of a tab member 119 which is located at the leading edge of the assembly and has a portion adjacent the trailing edge thereof adhered, as by an adhesive, to the liquid-confining or print-carrying layer 102 and the securing tab 116 which connects the envelope 110 to the layer 102. Handling tab 119 is of a convenient length and width for manual engagement and is centered on the longitudinal axis of the film assembly whereby the leading edge thereof may be located within the cutaway portions 60 and 61 of a pair of end members of the cassette 20 when the film assembly is mounted in the cassette. A flexible material such as paper, for example suitable film leader stock, may be used to form the tab 119. It is to be noted that the major or body portion of tab 119 is in effect hingedly connected to the outer surface of the liquid-confining or print-carrying layer 102 whereby it may be pressed into contact with said layer or angularly inclined thereto, as indicated by the dotted line in Fig. 16.

The self-developing film assembly of Fig. 16 is employed to carry out a photographic transfer process which, as it is now well understood to the art, is usable to provide in a print-carrying layer, such as the liquid-confining layer 102, a reverse image of a latent image contained in photographic negative material such as the liquid-confining layer 101. Transfer processing includes spreading a photographic developer and a silver halide fixer between the liquid-confining layers and bringing the layers into contact with each other. As previously pointed out, this may be accomplished by applying pressure to the opposite sides of the film assembly 100 by drawing the assembly through a pair of pressure-applying or wringer rolls. The result of this processing is to develop latent image to silver and to form in the photosensitive material, carried by the layer 101, a soluble silver complex from unexposed silver halide for transfer to the layer 102 which acts as a print-carrying element. This complex, at least in part, is transferred by imbibition to the print-carrying layer where it is developed to silver to provide the desired reversed image. After completion of processing, the layers 101 and 102 are stripped apart.

In certain instances it is desirable to provide a developed and fixed negative image without forming a transfer or positive image. Film unit 100 is adapted for this practice by appropriate formulation of the processing liquid employed in the container 107.

Photosensitive assemblies such as those illustrated herein make use of the principles of a transfer process. These principles, as well as specific film structures suitable for use in this invention, are set forth in United States Patents Nos. 2,543,181, issued February 27, 1951 to Edwin H. Land for Photographic Product Comprising a Rupturable Container Carrying a Photographic Processing Liquid, and 2,544,268, issued March 6, 1951 to Edwin H. Land for Photographic Product, and also in the copending applications of Edwin H. Land, Serial Nos. 652,612, filed March 7, 1946 (now Patent No. 2,634,886); 728,983 filed February 17, 1947 (now Patent No. 2,603,565); 7,795 filed February 12, 1948 (now Patent No. 2,647,056); and 185,642, filed September 19, 1950 (now Patent No. 2,565,378), said Patent No. 2,544,268 and Serial No. 185,642 being specific to film assemblies especially adapted for X-ray photography. These various copending applications and said patents include detailed descriptions of film assemblies which employ a liquid-confining layer having a photosensitive area and a liquid-confining layer in the nature of a print-carrying element which are adapted to contain all of the photographic materials needed to process the assembly. Also, the said patents and copending applications are detailed as to containers for holding processing materials and further include descriptions of liquid processing compositions usable with film assemblies including, in Patent No. 2,544,268 and Serial No. 185,642, a liquid processing composition employable to develop a negative without forming a positive image. The practices, photographic materials and compositions described in said patents and applications are generally suitable for carrying out the present invention and special reference to the details thereof are made in the just-mentioned copending applications and patents.

Preparation of the cassette 20 and the film assembly for use is carried out by preferably placing the cassette upon a support surface such as a table top with the front frame 22 of the cassette in contact with the support, following which the operating handle 59 is moved to raised position to withdraw the back plate 23 to its rearward location, the latch members 43 are moved to releasing position and the back frame 21 is pivoted about the hinges 34 and the cassette is opened. Hinge means 34 permit pivotal movement of the frames 21 and 22 through 180° with respect to each other so that the handle 59 may be utilized as a prop or brace for holding the frames in open relation at a separation of over 90 arcuate degrees by employment of the free end of said handle to provide a foot adapted to contact the support surface on which the front frame 22 is seated. Preferably, and for this reason, the free end of handle 59 is provided with a slight upward bend, as particularly well shown in Fig. 5a.

When a mounting is employed for the intensifying screen 40, such as that illustrated in Fig. 6, the next step in loading the cassette is to remove the screen therefrom by bodily lifting the screen out of the front frame 22. If the screen is hinged, as in the construction of Fig. 14, it is merely pivoted to an inoperative position whereby to obtain access to the interior of the front frame.

The film assembly 100 may now be placed in the cassette, preferably with the envelope wall member 115 and consequently the negative layer 101 adjacent the inner surface of the front plate, since this arrangement avoids geometrical reversal of the transfer image in the case of a self-developing film unit such as the film assembly 100. If geometrical reversal is unimportant, the film assembly 100 may be mounted in the cassette so that the liquid-confining or positive layer 102 is located adjacent the front plate 24. As will presently become apparent, the film assembly 100 may be mounted in the cassette so that the hinged or leading end of the assembly is located at either end of the cassette.

After the film assembly 100 has been placed in the cassette, the print-carrying layer 102 is pivoted about its hinge means so as to permit the intensifying screen 40 to be positioned within the front frame 22 of the cassette and in contact with the envelope wall portion 114. If the intensifying screen is coated on one side only with a fluorescent material, this side is placed adjacent the envelope 110. Following the positioning of the screen 40 with the tabs 42 thereof mounted in the screen-receiving recesses 44, the print-carrying element or layer 102 is moved into overlying contact with the intensifying screen 40 whereby the screen is located between the layer 102 and the envelope wall 114.

When a hinged screen, such as that shown in Fig. 14, is employed, it is pivoted about its hinges to its operating position in contact with the envelope 110, following which the layer 102 is moved to superposed and contacting relation with the screen. In the case of the screen construction employed in Figs. 12 and 13, it is unnecessary to remove the screen for the purposes of mounting the film assembly due to the fact that springs 64 will maintain the screen in spaced relation to the front plate 24. This permits the envelope 110 to be inserted within the space between the screen and the front plate and to have the print-carrying layer 102 positioned over the other surface of the screen.

The film assembly in mounted position, with the intensifying screen 66 located between the layer 102 and the envelope wall 114, is adjusted within the front frame 22 so that the end of the envelope 110 most distant from the tear string 118 will extend beyond one end of the frame with the trailing end of the mask 109 roughly located to fill one cutaway portion 60 in an end member of the front frame. As a consequence, the end of the envelope 110 at the tear string will be approximately aligned with the other end of the front frame and the handling tab 119 will extend within the cutaway portion 60 in the last-mentioned end of the front frame. This arrangement permits a part of the severing or tear string 118 to be located outside of the cassette. These various locations of the different parts of the film assembly are duplicated for the back frame, which is provided with end members similar to the end members of the front frame and which is located in superposed and registered relation with the front frame when the cassette is closed. In this regard, special reference is made to Fig. 17, which shows a film assembly 100 within a closed cassette 20.

Following positioning operations for the film assembly, the back frame 21 of the cassette is pivoted about the hinge means to close the cassette which is secured in closed position by latch means 36 and 43. During these operations, handle 59 is kept in its upright position to retract the back plate 23 and in fact when in this position has utility as means for lifting or otherwise handling the cassette.

To remove envelope 110 from the closed cassette, the severing string 118 is pulled by one hand outwardly or away from the end of the cassette and preferably while holding the closed end of envelope 110 which protrudes from the cassette. By this operation, the connections between the envelope 110 and the layers 101 and 102 are broken at the leading end of the film assembly whereby the envelope may be withdrawn through the end of the cassette which is adjacent the trailing end of layers 101 and 102. Removal of envelope 110 is accomplished by pressing the handling tab 119 into contact with the adjacent end member of the front frame while pulling the envelope 110 in a direction away from the other end of the cassette. The engagement or connection of the tabs on the intensifying screen with one or more side members of the front frame will substantially prevent longitudinal movement of the screen upon withdrawal of the envelope 110 from the cassette. If desired, the envelope wall member 114 may be provided with a notched or cutaway portion, as shown in Fig. 16, at a location adjacent the hinge provided by leader 103 whereby to avoid accidental holding of the envelope at the hinged end of the film assembly while endeavoring to withdraw the envelope from the cassette.

As will be recalled, when the handle 59 is in its upright position, the back plate 23 is retracted whereby the envelope 110 or the film assembly itself is removable through the ends of the closed cassette. The securing means for the frames of the cassette and the light-seal means are sufficiently tight to prevent the access of actinic light into the film-holding compartment 30 when the operating handle 59 is in the upright position described.

It will now be appreciated why the film assembly may be loaded into the cassette with the leading end of the assembly located at either end of the cassette. It will also be appreciated that the cassette and the film assembly are especially designed for daylight loading. The film assembly, when once mounted in the closed cassette, will be held in a substantially lighttight container and the removal of the envelope 110 from the assembly will have no effect upon this condition. Consequently, the cassette itself provides a ready means for handling the film assembly in illuminated surroundings and, once loaded, is also useful as a storage means for the film assembly.

As a final step in preparation to exposing the film assembly, operating handle 59 is moved into overlying position with respect to the back plate whereby to cause the back plate to transmit pressure to the opposite sides of the film assembly to hold it in intimate contact with the intensifying screen.

Exposure of a film assembly 100 mounted in cassette 20 is carried out in the usual manner and from the front of the cassette. Following exposure, the film assembly is ready for processing. Processing of the film assembly 100 is simply effected by the use of a pair of pressure rolls as hereinbefore described. These rolls also function to withdraw the film assembly from the cassette 20. The engagement or connection of the tabs on the intensifying screen with one or more side members of the front frame will substantially prevent longitudinal movement of the screen upon withdrawal of the film assembly from the cassette. Processing is carried out in the absence of light and may conveniently take place within apparatus comprising a lighttight box in which the pressure rolls are mounted and which is provided with a hinged cover or other closure to permit the cassette to be positioned on a support within said box for operative engagement of the film assembly with said rolls.

Before placing the cassette in the processing box, the end portion 104 of the leader 103 is pulled outwardly whereby to extend the leader for a distance of several inches beyond the end of the cassette and the operating handle 59 is then raised whereby to relieve pressure on the film assembly 100 to facilitate its easy withdrawal from the cassette. The cassette is then placed in the processing box with the end of the cassette aligned with the axes of the pressure rolls and with a part of the extending leader portion 104 positioned between said rolls. Means are provided for holding the cassette within the processing box in the just described position.

The processing box is then closed and the rolls are brought into pressure contact and rotated. This causes the exposed film assembly to be withdrawn from the cassette which is fixedly held with respect to the rolls and discharges the film from the rolls, at least in part, into a lighttight imbibition chamber in the processing box. The processing rolls are so arranged that they are separated when the trailing end of the film assembly, including a part of the trailing end of the mask 109, has been moved to a position between the rolls and at this time the rotation of the rolls is arrested. The processed film assembly is allowed to remain in the lighttight imbibition chamber for a time sufficient to permit the image-forming reactions to be carried out, i. e., for an imbibition time of about one minute, and is then removed from the imbibition chamber. Layers 101 and 102 of the processed film are then striped apart, the transfer image being provided on the layer 102.

The liquid within the container 107 contains a viscous film-forming material which is adapted to adhere the mask 109 and the spacer strips carried on the mask to the layer 101 by a bond which is stronger than the adhesive bond between the mask and the layer 102. As a result, when the layers 101 and 102 are stripped apart, the mask adheres to the layer 101. Layers 101 and 102 may be completely disconnected from each other after they have been peeled apart.

Cassette 20 is subject to various modifications. For example, the cassette 20 may be constructed so that it may be used with conventional X-ray film as well as with self-developing film of the type illustrated in Fig. 16. This is carried out by removably or fixedly mounting a second intensifying screen in the front frame 22 and supporting this second screen on the inner surface of the front plate 24. Under these circumstances, the depth of the front frame will be increased to accommodate the thickness of the additional intensifying screen which is mounted therein. The second intensifying screen carried by the front frame permits conventional X-ray film of the character having an emulsion on each side of a film base to be mounted in the cassette with an intensifying screen on each side of the film. If X-ray film having an emulsion on only one side thereof is utilized, this film is placed with the emulsion face adjacent the second intensifying screen and the intensifying screen 40 is removed when carrying out an exposure.

The cassette is easily converted for use with self-developing film of the type illustrated in Fig. 16 in instances where the cassette is provided with an intensifying screen on the inner surface of the front plate 24. Under these circumstances, the intensifying screen adjacent the front plate 24 is merely made so that it is removable from the cassette and is removed when the film assembly 100 is employed in the cassette. Alternatively, if an intensifying screen is fixedly mounted on the inner surface of the front plate 24, it may be covered with a sheet of material which is substantially opaque to visible and near visible light. Such a sheet or plate of material is merely placed loosely on the second intensifying screen by dropping it in the front frame of the cassette. An example of an opaque material comprises that employed in forming the envelope 110. As a further modification, the envelope 110 may be constructed so that the surface adjacent the front plate may be adhered to the second intensifying screen. In such an event, the envelope is so constructed that the wall portion 114 thereof is completely severed from the envelope whereby it may be withdrawn from the cassette without the withdrawal of the envelope wall 115. It will of course be understood that conventional X-ray film of the character described may be enclosed within envelope means similar to the envelope 110 whereby it may be loaded into the cassette in illuminated surroundings.

Other structural modifications of the cassette are included within the scope of this invention. For example, the intensifying screens 40, 54 and 66 have been shown and described in connection with all figures used in the drawings as associated with the front frame 22. It is pointed out that the intensifying screens 40, 54 or 66 may be associated with either frame of the cassette. From the standpoint of convenience, it is however preferable to mount the screen in the front frame 22. Provision for mounting the intensifying screen in the back frame 21 merely requires an increase in the depth or thickness of the back frame whereby to permit accommodation of the screen while still allowing movement of the back plate 23 relative to its frame and a duplication of any of the screen mounting means heretofore described and illustrated.

It is possible to carry out X-ray photography without the use of an intensifying screen, as previously intimated. It will, however, be understood that while use of an intensifying screen is desirable, the employment of a screen is not essentially necessary to carry out X-ray photography and the omission of an intensifying screen from the cassette shown herein is deemed to fall within the scope of this invention. In fact, either of the liquid-confining layers 101 or 102 may carry a layer of fluorescent material which may be coated on the inner or directly overlying surfaces of either of said layers.

While the present invention has been described in connection with photography, including X-ray photography, it will be appreciated that the concepts set forth herein include other fields. For example, a loaded cassette provides an excellent means for indicating and/or measuring dosages of nuclear radiation, such as electromagnetic radiation having a wavelength shorter than the wavelength of radiation within the ultraviolet region of the spectrum and including, besides X-rays, gamma rays and corpuscular radiation, such as alpha particles, beta particles, fission product particles, and the like. Inasmuch as the photosensitive materials employed are sensitive to nuclear radiation of the character described, and since such radiation will penetrate the cassette and effect exposure of the photosensitive material, the importance of this invention as applied to dosimetry will at once be understood. Furthermore, the processing apparatus as set forth herein provides quick and efficient means for processing a film assembly to determine the radiation dosage to which it has been subjected from the density value of the transfer print resulting from the processing of the film unit.

As a further modification falling within the concept of this invention, the cassette may be so constructed that the end members of the front and back frames are unrelieved whereby passageways 32 extending through the ends of the cassette into the compartment 30 will be eliminated. By this variation, each pair of end members will be in contact substantially throughout their respective lengths when the cassette is closed.

Cassettes of the character illustrated are generally employed in obtaining relatively large size X-ray prints. For example one practical embodiment employs a cassette having overall length and width dimensions of about thirteen inches by eleven inches. Under these conditions, a film assembly will be used which, without the envelope, has overall length and width dimensions of about thirteen inches by ten inches. The envelope is made so that it extends beyond the end of the negative and positive layers of the film assembly and will increase this overall length of the film assembly by about one-half inch. It will be understood that cassettes and film assembles of this general construction but of either larger or smaller size fall within the inventive concept.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. An X-ray cassette comprising frame means having an opening therethrough, a pair of members in the form of plates, a first one of said plates being mounted within said frame means and closing the opening therein at one side of said frame means, the second of said plates being mountable in said frame means in superposed relation to said first plate to close the opening at the second side of said frame means and provide a compartment in said cassette for holding a photosensitive film assembly, means for mounting said second plate in said frame means so that it is removable from said superposed relation with said first plate whereby to gain access to said compartment, spring means carried by said second plate and normally biasing said second plate when both said plates are superposed for movement toward the first-mentioned plate, and lever mechanism for moving said second plate against the spring pressure of said spring means to a position separated from said first plate and for releasably retaining said second plate in said position, said lever mechanism being carried by said second plate and having a part thereof in bearing contact with opposed marginal portions of said frame means and said lever mechanism including a manually rockable operating member for effecting the actuation of the mechanism, said frame means and plates being formed of material which is substantially opaque to actinic light, said cassette being provided with light-seal means for preventing the access of actinic light therein.

2. An X-ray cassette comprising a pair of similar frames each having an opening therethrough, said frames being removably mounted one upon the other in superposed and contacting relation and with said openings substantially in registration, means for releasably securing said frames in said superposed and contacting relation, a pair of members in the form of plates, one plate for each frame and each plate being mounted within its respective frame and closing the opening therein, said frames and said plates together providing a compartment within said cassette for holding a photosensitive film assembly, an intensifying screen, and mounting means provided on one of said frames for supporting said screen within said cassette at a location between said plates, said frames and plates being formed of material which is substantially opaque to actinic light, said cassette being provided with light-seal means for preventing the access of actinic light therein.

3. An X-ray cassette as defined in claim 2 wherein said intensifying screen is positionable in spaced relation to said plates.

4. An X-ray cassette as defined in claim 2 wherein said mounting means supports said intensifying screen for movement toward and away from one of said plates, and wherein said screen is positionable in spaced relation to said plates.

5. In an X-ray cassette as defined in claim 1, an intensifying screen, and mounting means provided on said frame means for supporting said screen within said cassette at a location between said plates.

6. In an X-ray cassette as defined in claim 1, an intensifying screen, and mounting means provided on said frame means for supporting said intensifying screen within said cassette for movement toward and away from said first-mentioned plate.

7. In an X-ray cassette as defined in claim 1, an intensifying screen, and mounting means provided on said frame means and supporting said screen within said frame means adjacent said first-mentioned plate, said mounting means supporting said screen for movement toward and away from said first plate whereby said screen is positionable in spaced relation thereto.

8. An X-ray cassette as defined in claim 1, including an intensifying screen and mounting means provided on said frame means for supporting said screen frame means for movement toward and away from said first plate, and wherein said second plate provides means for transmitting pressure to said screen for moving said screen toward said first plate and for holding said screen in a position into which it has been moved.

9. An X-ray cassette comprising a pair of similar frames each having an opening therethrough, said frames being removably mounted one upon the other in superposed and contacting relation and with said openings substantially in registration, means for releasably securing said frames in said superposed and contacting relation, a member in the form of a plate mounted within one of said frames and closing the opening therein, a second member in the form of a plate mounted within the second of said frames and closing the opening therein, means for mounting one of said plates in its respective frame for movement relative to the other frame, said frames and said plates together providing a compartment within said cassette for holding a photosensitive film assembly, an intensifying screen, mounting means provided on one of said frames for supporting said screen within said cassette for movement toward and away from one of said plates, said screen being positionable in spaced relation to said plates whereby said photosensitive film assembly is mountable in said cassette adjacent opposite surfaces of said screen, and means, including said movably mounted plate, for applying pressure to said film assembly and to said screen to press said film assembly into substantially intimate contact with the opposite surfaces of said screen, said frames and plates being formed of material which is substantially opaque to actinic light, said cassette being provided with light-seal means for preventing the access of actinic light therein.

10. In an X-ray cassette as defined in claim 1, an intensifying screen, mounting means provided on said frame means for supporting said screen in said frame means for movement toward and away from said first-mentioned plate, said screen being positionable in spaced relation to said first plate whereby to provide a chamber between said first plate and said screen for receiving at least a portion of a photosensitive film assembly adapted to be mounted in said cassette, and said second-mentioned plate and the spring means carried thereby transmitting pressure to said screen for moving the screen into contact with said portion of said film assembly and for holding said screen in contact therewith.

11. An X-ray cassette comprising a pair of similar frames each having an opening therethrough, a pair of plates, one plate for each frame, each said plate being mounted within its respective frame and closing the opening in said frame, said frames being removably mounted one upon the other in superposed and contacting relation and with said openings substantially in registration, means for releasably securing said frames in said superposed and contacting relation, said frames and said plates together providing a compartment within said cassette for a photosensitive film assembly, and means at opposite ends of said cassette providing individual passages in the superposed frames thereof which open into said compartment at opposite ends thereof and through each of which at least a part of a film assembly positioned within said cassette is freely movable, said frames and plates being formed of material which is substantially opaque to actinic light, said cassette being provided with light-seal means, including a light seal at each said passage, for substantially preventing the access of actinic light into said cassette.

12. An X-ray cassette comprising frame means having an opening therethrough, a pair of plates, a first one of said plates being mounted within said frame means and closing the opening therein at one side of said frame means, the second of said plates being mountable in said frame means in superposed relation to said first plate to close the opening at the second side of said frame means and provide a compartment within said cassette for a photosensitive film assembly, means for mounting said second plate in said frame means so that it is removable from said superposed relation with said first plate whereby to gain access to said compartment, said cassette being provided at opposed ends thereof with an individual passage which extends through each said end of said cassette between said plates and which opens into said compartment, each said passage providing means for withdrawing from each end of said cassette at least a part of a photosensitive film assembly which is mounted in the cassette, said frame means and plates being formed of material which is substantially opaque to actinic light, and light-seal means carried by said cassette for substantially preventing the access of actinic light into said compartment.

13. In an X-ray cassette as defined in claim 11, hinge means pivotally connecting said frames together.

14. An X-ray cassette as defined in claim 11 wherein said frames are separable from each other and wherein said means for releasably securing said frames in superposed and contacting relation comprise a latch mechanism carried by said frames along opposite sides thereof.

15. In an X-ray cassette as defined in claim 11, an intensifying screen, and mounting means carried by said cassette for supporting said screen within said compartment and between said plates.

16. In an X-ray cassette as defined in claim 12, an intensifying screen, and mounting means carried by said cassette for supporting said screen within said compartment and between said plates, said screen being positionable in spaced relation to said plates.

17. An X-ray cassette comprising frame means having an opening therethrough, a pair of plates, a first one of said plates being mounted in said frame means and closing the opening therein at one side of said frame means, the second of said plates being mountable in said frame means in superposed relation to said first plate to close the opening at the second side of said frame means and provide a compartment within said cassette for a photosensitive film assembly, means for mounting said second plate in said frame means so that it is removable from said superposed relation with said first plate whereby to gain access to said compartment, means carried by said second plate and normally biasing said second plate when both said plates are superposed for movement toward the first plate, said cassette being provided at opposite ends thereof with an individual passage through each said end of said cassette and into said compartment, each said passage providing means for withdrawing from said cassette at least a part of a photosensitive film assembly which is mounted therein, said frame means and plates being formed of material which is substantially opaque to actinic light, and light-seal means carried by said cassette for substantially preventing the access of actinic light into said compartment.

18. In an X-ray cassette as defined in claim 17, an intensifying screen, and mounting means carried by said cassette for supporting said screen within said compartment and between said plates, said screen being positionable in spaced relation to said plates.

19. In an X-ray cassette as defined in claim 17, an intensifying screen, mounting means carried by said cassette for supporting said screen within said compartment and between said plates, and wherein said frame means comprises connecting hinge means for mounting one of said plates for pivotal movement relative to the other of said plates whereby said plates may be moved with respect to each other from said superposed relation for gaining access to said compartment.

20. An X-ray cassette comprising a pair of frames each having an opening therethrough, a pair of plates, one of said plates being mounted in one of said frames and closing the opening therein, the second of said plates being mounted in the second of said frames so as to close the opening therein and being supported for movement relative to said second frame, means for mounting said frames in superposed and contacting relation, means for releasably securing said frames in superposed and contacting relation including a latch mechanism carried by said frames along opposite sides thereof, said frames and said plates together providing a compartment within said cassette for a photosensitive film assembly, an intensifying screen, mounting means carried by said cassette for supporting said screen within said compartment and between said plates, means carried by said second frame and normally biasing said second plate for movement toward the first plate, said frames, at opposite ends of said cassette, providing a passage through each end of said cassette and into said compartment, each said passage providing means for withdrawing from said cassette at least a part of a photosensitive film assembly which is mounted therein, said frames and plates being formed of material which is substantially opaque to actinic light, and light-seal means carried by said frames for substantially preventing the access of actinic light into said compartment.

21. An X-ray cassette as defined in claim 2 wherein said intensifying screen is removably mounted within said cassette.

22. An X-ray cassette as defined in claim 2 wherein said intensifying screen is slidably supported in said frame means for movement toward and away from said first-mentioned plate.

23. An X-ray cassette as defined in claim 2 wherein the means for mounting said intensifying screen are hinge means.

24. A photographic product comprising a photosensitive film assembly having a first liquid-confining layer, a second liquid-confining layer, means connecting said layers together whereby the liquid-confining layers are positionable in superposed relation, a container holding a liquid composition including at least a solvent for a silver halide developer and located between and extending transversely of said liquid-confining layers to discharge its liquid content for spreading between and in contact with said layers, said first liquid-confining layer including a photosensitive silver halide portion on the inner surface thereof and adapted to overlie the inner surface of the second liquid-confining layer when said liquid-confining layers are superposed, said film assembly containing processing material, including a silver halide developer, in an amount sufficient to process a latent image in said photosensitive portion of said first liquid-confining layer, said liquid composition, upon rupture of said container, rendering said processing material effective to process said image, an envelope, formed of a material which is substantially opaque to actinic light, encasing said first liquid-confining layer of said two liquid-confining layers and including the photosensitive portion of said first liquid-confining layer, means forming a part of said envelope and connected to said film assembly for securing said envelope in surrounded and encasing relation to said first liquid-confining layer, manually operable means for disconnecting from said film assembly the part of said envelope which is secured thereto, a cassette housing said film assembly, said cassette having frame means having an opening therethrough, a pair of plates, a first one of said plates being mounted in said frame means and closing the opening therein at one side of said frame means, the second of said plates being mountable in said frame means in superposed relation to said first plate to close the opening at the second side of said frame means and provide a compartment within said cassette in which said photosensitive film assembly is to be mounted, means for mounting said second plate in said frame means so that it is removable from said superposed relation with said first plate whereby to gain access to said compartment, said cassette being provided at opposite ends thereof with a passageway which extends therethrough and which opens into said compartment, said film assembly being slidable through each said passageway and having a length which is greater than said cassette whereby said film assembly is mountable within said cassette to have a portion thereof, including said envelope and said manually operable disconnecting means, extend through said passageways to permit disconnection of said envelope from said film assembly and withdrawal of the envelope from said cassette and to permit withdrawal of said two liquid-confining layers and container from said cassette, said frame means and plates being formed of material which is substantially opaque to actinic light, said cassette being provided with light-seal means, including a light seal at each said passageway, for substantially preventing the access of actinic light into the cassette.

25. In a photographic product as defined in claim 24, an intensifying screen, and mounting means carried by said cassette for supporting said screen within said compartment and between said plates, said mounting means being so arranged and constructed that said screen is positionable in spaced relation to said plates.

26. In a photographic product as defined in claim 24, an intensifying screen, mounting means carried by said cassette for supporting said screen within said compartment for movement toward and away from one of said plates, said mounting means being so arranged and constructed that said screen is positionable in spaced relation to said plates whereby one of said liquid-confining layers of said film assembly is adapted to be located on one side of said screen and the other liquid-confining layer is adapted to be located on the other side of said screen.

27. In a photographic product as defined in claim 24, means for mounting the second of said plates for movement relative to said frame means and means carried by said second plate for normally biasing said second plate when both said plates are superposed for movement toward the first-mentioned plate and for pressing it into contact with the film assembly mounted within said cassette.

28. In a photographic product as defined in claim 24, means for mounting the second mentioned plate for movement relative to said frame means, an intensifying screen, means carried by said cassette for mounting said intensifying screen within said compartment in spaced relation to said plates whereby said screen may be located between said liquid-confining layers of the film assembly mounted within the cassette, said mounting means for said screen being so arranged and constructed as to permit movement of said screen toward and away from said first plate, means carried by said second plate and normally biasing the second plate when both said plates are superposed for movement toward said first plate whereby said second plate and the biasing means therefor transmit pressure to said screen and said film assembly for holding the first and second liquid-confining layers and said screen in contact with each other.

29. An X-ray cassette comprising frame means having an opening therethrough, a pair of members in the form of plates, one of said plates being mounted within said frame means and closing the opening therein at one side of said frame means, the second of said plates being mountable in said frame means in superposed relation to said first plate to close the opening at the second side of said frame means and provide a compartment within said cassette for holding a photosensitive film assembly, means for mounting said second plate in said frame means so that it is removable from said superposed relation with said first plate whereby to gain access to said compartment, an intensifying screen, and mounting means provided on said frame means for supporting said screen within said cassette at a location between said plates for movement toward and away from one of said plates, said frame means and plates being formed of material which is substantially opaque to actinic light, said cassette being provided with light-seal means for preventing the access of actinic light therein.

30. An X-ray cassette comprising a front frame and a back frame each having an opening therethrough, said frames being similar with respect to each other and removably mounted one upon the other in superposed and contacting relation and with said openings thereof substantially in registration, means for releasably securing said frames in mounted relation, a member in the form of a plate fixed in said front frame and providing a closure for the opening therein, a second member in the form of a plate carried in said back frame and providing a closure for the opening therein, said plates being superposed with respect to each other when said frames are mounted one upon the other and said frames and plates together providing a compartment within said cassette for holding a photosensitive film assembly, mounting means for supporting said back plate in said back frame for movement within said frame toward the front and back of said cassette, spring means carried by said back plate and normally biasing said back plate when said frames are in mounted relation for movement toward said front plate and the front of said cassette, and lever means for moving said back plate against said spring pressure and toward the back of said cassette to a position separated from said front plate and for releasably retaining the back plate in said position, said lever means being carried by said back plate and having a part thereof in bearing contact with opposed marginal portions of said back frame and said lever means including a manually rockable operating member for effecting the actuation thereof, said frames and plates being formed of material which is substantially opaque to actinic light, said cassette being provided with light-seal means for preventing the access of actinic light therein when said frames are secured in said mounted relation.

References Cited in the file of this patent

UNITED STATES PATENTS

| Number | Name | Date |
|---|---|---|
| 653,383 | Gates | July 10, 1900 |
| 1,166,797 | White | Jan. 4, 1916 |
| 1,449,970 | Bucky | Mar. 27, 1923 |
| 2,056,279 | Kulick | Oct. 6, 1936 |
| 2,371,843 | Powers | Mar. 20, 1945 |
| 2,539,254 | Kamiss | Jan. 21, 1951 |
| 2,544,268 | Land | Mar. 6, 1951 |
| 2,562,453 | Goldsmith | July 31, 1951 |
| 2,590,891 | Reuter | Apr. 1, 1952 |